United States Patent [19]

Nozawa et al.

[11] Patent Number: 4,785,362
[45] Date of Patent: Nov. 15, 1988

[54] DRIVING FORCE BRANCHING GEAR MECHANISM

[75] Inventors: Katsuya Nozawa; Hidenori Muramatsu; Kimichika Yamada; Hitoshi Okada; Yoshihiko Goto; Hiroyuki Ohkawa, all of Tokyo, Japan

[73] Assignee: Clarion Co., Ltd., Tokyo, Japan

[21] Appl. No.: 83,581

[22] Filed: Aug. 7, 1987

[30] Foreign Application Priority Data

Aug. 14, 1986 [JP] Japan .................. 61-191101

[51] Int. Cl.⁴ .................. G11B 15/665; F16H 47/00; F16H 55/17
[52] U.S. Cl. .................. 360/85; 74/435; 74/665 GA; 74/665 Q
[58] Field of Search ........... 360/85; 74/435, 665 GA, 74/665 Q

[56] References Cited

U.S. PATENT DOCUMENTS 4,562,496 12/1985 Saito et al. .................. 360/85
4,611,251 9/1986 Yokoo .................. 360/85

Primary Examiner—Robert S. Tupper
Attorney, Agent, or Firm—Flynn, Thiel, Boutell & Tanis

[57] ABSTRACT

A driving force branching gear mechanism, which is useful for a tape recorder provided with a rotary head, etc., is disclosed, in which a driving gear consisting of two great diameter cam gears fixed to each other in one body and two small diameter cam gears driven by the two great diameter cam gears, repsectively, are disposed and they are so arranged that each of the small diameter cam gears is driven, only when its gear section is in opposition to each of the great diameter cam gears and that its cut-off portion for fixation is located on the projecting portion of the cam section of each of the great diameter cam gears and fixed there, when the cam section of each of the small diameter cam gears is in opposition to the cut-off portion of the gear of each of the great diameter cam gears.

2 Claims, 3 Drawing Sheets

DRIVING FORCE BRANCHING GEAR MECHANISM

FIELD OF THE INVENTION

This invention relates to a driving force branching gear mechanism driving independently 2 gear driving systems by a single driving motor.

BACKGROUND OF THE INVENTION

Recently development and use in practice of magnetic recording devices using rotary heads, such as 8 mm video tape recorders, digital tape recorders, etc. have been advanced.

In such devices the construction is apt to be complicated and large with respect to that of the conventional fixed head type devices, because, in addition to the requirement of the space for locating the rotary head and thesspace for the driving system necessary for utilizing the rotary head, a tape loading mechanism drawing-out a tape loading block, a subblock, guide posts, a pinch roller, etc. necessary for winding a tape around the rotary head are inevitable.

For this reason it is tried to reduce the size while simplifying the construction in each part and in particular, as one of these trials to reduce the number of driving motors by driving 2 driving systems having different timings by means of a single driving motor.

Heretofore, as such a mechanism for branching the driving force, are used a gear mechanism, by which a cam is disposed on a driving gear, which drives a driving system by engagement of gears, and the second driving system is driven by this cam, a gear mechanism, by which two intermittent gears are disposed on both the sides of the driving gear so as to be driven alternately, and so forth.

However, in the former gear mechanism using a cam gear, since the first driving system is driven by a certain rotation angle of the cam gear and the second driving system is driven by the cam for the remaining driving rotation angle, in the case where the remaining driving rotation angle is small, the cam driving is not possible and thus its field of utilization is extremely restricted. On the other hand, in the latter gear mechanism using intermittent gears, since it is so constructed that, after the drive of the first driving system by means of the first intermittent gear, it is held at its intermittent position, while the second intermittent gear is driven, means for holding the intermittent gear at its intermittent position, means for calling-in it from its intermittent position, etc. are necessary. Therefore the construction is apt to be complicated and large and in addition, it is necessary for the driving motor to be switched on and off during the interval between the operations of the two driving systems, depending on the operation timing of the two driving systems. Thus it has problems that the electrical connection is complicated because of this fact, etc., which finally restricts its field of utilization.

Such problems as described above existed not only in the magnetic recording devices using the rotary head but also in electric apparatuses in general, which are provided with a plurality of driving systems using a single driving motor, and for which it is required to reduce the size and to simplify the construction.

OBJECT OF THE INVENTION

As described above, the prior art driving force branching gear mechanism had problems that its field of utilization was restricted, that its construction was large and complicated, etc.

This invention has been done in order to resolve these problems and its object is to provide a driving force branching gear mechanism permitting to enlarge the field of utilization of the magnetic recording device having a rotating head and to realize the reduction of size and the simplification thereof, which can be utilized specifically therein.

SUMMARY OF THE INVENTION

The driving force branching gear mechanism according to this invention is characterized in that it comprises a first and a second great diameter cam gears, each of which consists of a cam section and a gear section, the latter having a cut-off portion corresponding to the projecting portion of the former, these great diameter cam gears being fixed up and down to each others in one body so as to form a driving gear, and a first and a second small diameter cam gears driven by the first and the second great diameter cam gears, respectively, a recess portion being disposed in the cam section of each of the small diameter cam gear, which recess portion can be placed on the projecting portion in the cam section of the corresponding great diameter cam gear and fixed there.

Since the driving force branching gear mechanism according to this invention is so constructed as described above, each of the small diameter cam gears is driven, only when its gear section is in opposition to the gear section of the corresponding great diameter cam gear, and when its gear section is in the cut-off portion in the gear section of the corresponding great diameter cam gear, the fixing cut-off portion in the cam section is located on the projecting portion in the cam section and fixed there. Consequently the operation timing of each of the small diameter cam gear can be set independently and arbitrarily by suitably selecting the driving rotation angle of each of the great diameter cam gear and the positional relation among the cam gears including the small diameter cam gears. That is, since it is possible to hold both the small diameter cam gears in their fixed state while making the great cam gear rotate, even if there is an interval between the operation timings of driving systems driven by the small diameter cam gears, it is not necessary to stop the great diameter cam gear and therefore it is unnecessary to switch on and off the driving motor, which permits to enlarge the field of utilization and at the same time to realize the reduction of the size and the simplification of the construction.

DETAILED DESCRIPTION

Figure 1:
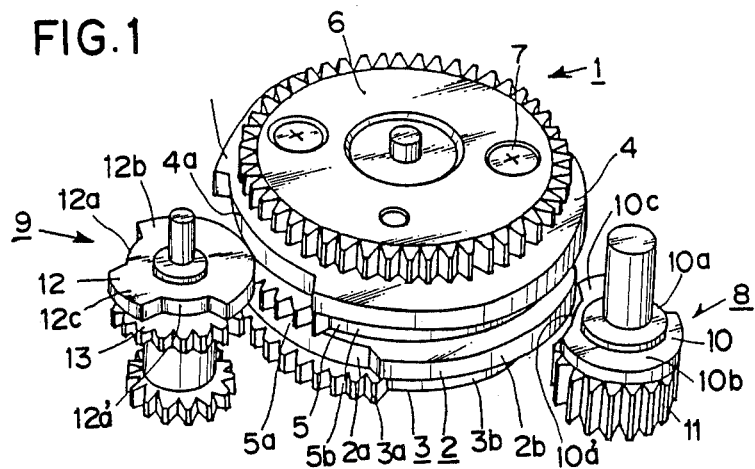
FIG. 1 is a perspective view illustrating principal parts of an embodiment of the driving force branching gear mechanism according to this invention.

Hereinbelow an embodiment, by which the driving force branching gear mechanism according to this invention as explained above is applied to a magnetic recording device having a rotary head will be explained concretely, referring to the drawings.

In FIG. 1 reference numeral 1 represents a driving gear, which is formed by a first great diameter cam gear consisting of a cam section 2 and a gear section 3, a second great diameter cam gear consisting of a cam section 4 and a gear section 5, and a linking gear 6 engaging with a gear on the side of the driving motor, superposed successively on each other and fixed to each other in one body by means of screws 7.

The cam section 2 of the first great diameter cam gear consists of a recess portion 2a extending over about 240° and a projecting portion 2b extending over about 120°. In the gear section 3 is disposed a gear 3a only at a region superposed on the recess portion 2a and the two edges of the projecting portion 2b on both the sides thereof, the other region forming a cut-off portion 3b. The cam section 4 of the second great diameter cam gear consists of a recess portion 4a extending over about 70° and a projecting portion 4b. In the gear section 5 is disposed a gear 5a only at a region superposed on the recess portion 4a and the two edges of the projecting portion 4b on both the sides thereof, the other region forming a cut-off portion 5b. Further the diameter of the projecting portions 2b and 4b of the cam sections 2 and 4 of the first and the second great diameter cam gears, respectively, is approximately equal to the outer diameter of the gears 3a and 5a of the gear sections 3 and 5, respectively, and the diameter of the recess portions 2a and 4a of the cam sections 2 and 4, respectively, is approximately equal to the cut-off portions 3b and 5b of the gear sections 3 and 5, respectively.

On both the sides of the driving gear 1 are disposed a first and a second small cam gears 8 and 9. The first small cam gear 8 consists of a cam section 10 and a gear section 11 linked with the cam section 2 and the gear section 3, respectively, of the first great diameter cam gear, the two sections 10 and 11 being formed in one body. The second small diameter cam gear 9 consists of a cam section 12 and a gear section 13 linked with the cam section 4 and the gear section 5, respectively, of the second great diameter cam gear. The gear sections 11 and 13 of the small cam gears 8 and 9 have no cut-off portions, but gears are formed all around them. In each of the cam sections 10 and 12 are formed two recess portions 10a and 10a'; 12a and 12a', respectively, and between these recess portions 10a and 10a'; 12a and 12a' are disposed a long stroke projecting portion 10b; 12b and a short stroke projecting portion 10c; 12c. Further the outer diameter of the gear sections 11 and 13 is approximately equal to the diameter of the long and the short stroke projecting portions 10b, 10c and 12b, 12c.

In addition the mutual positional relation between the gears 3a and 5a, which are driving sections in the first and the second great diameter cam gears, consequently the mutual positional relation between the recess portions 2a and 4a in the cam sections 2 and 4 and the positional relation between the gears 3a; 5a and the first and the second small cam gears 8; 9 are determined as follows.

Figure 2A:
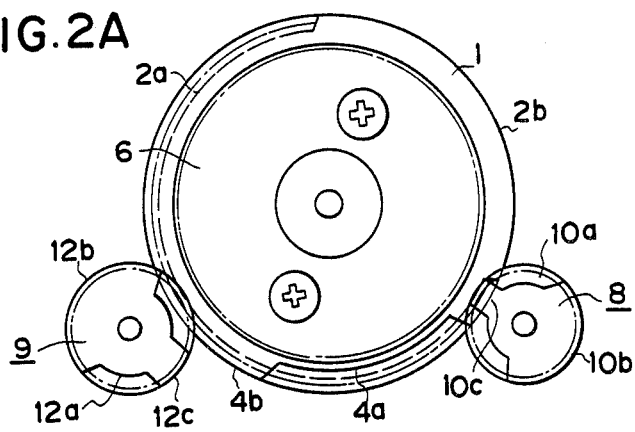
FIGS. 2A, 2B, 2C and 2D are plan views illustrating stepwise the operation of the small diameter cam gears.
Figure 2B:
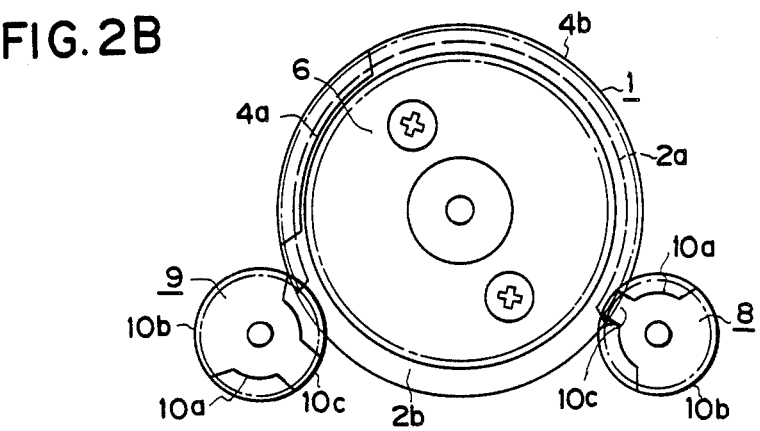

At first, at the operation starting position, as indicated in FIG. 2A, the short stroke projecting portion 10c of the cam section 10 of the first small diameter cam gear 8 is located at the end portion on the starting point side of the recess portion 2a of the first great diameter cam gear so that the gear portion 11 of the first small diameter cam gear 8 is engaged with the end portion of the gear 3a of the first great diameter cam gear and that at the same time the recess portion 12a of the second small diameter cam gear 9 is placed in opposition to the projecting portion 4b of the second great diameter cam gear. Further the stroke of the gear 3a of the first great diameter cam gear is set so as to correspond to 2 turns of the first small diameter cam gear 8. Consequently the first small diameter cam gear 8 is fixed with respect to the rotation of the driving gear 1 after having been driven by 2 turns by locating the short stroke projecting portion 10c of the cam section 10 in opposition to the end portion on the terminating side of the recess portion 2a of the first great diameter cam gear, as indicated in FIG. 2B and further locating the recess portion 10a of the cam section 10 in opposition to the projecting portion 2b of the cam section 2 of the first great diameter cam gear, as indicated in FIG. 2C.

Figure 2C:
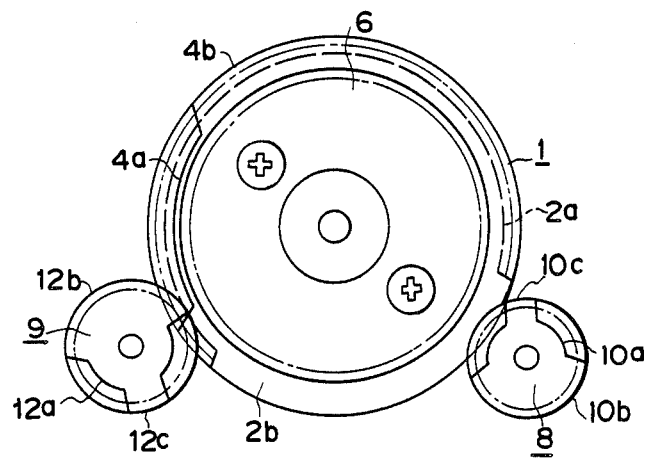
Figure 2D:
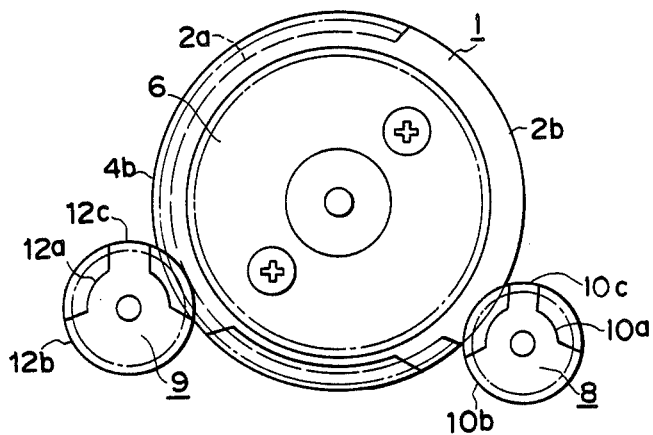

On the other hand, the second small diameter cam gear 9 is engaged with the gear 5a of the second great diameter cam gear, as indicated in FIG. 2C, after the first small diameter cam gear 8 has finished its operation and been fixed. Further the stroke of the gear 5a of the second great diameter cam gear is equal to the stroke of the projecting portion 12b of the cam section 12 of the second small diameter cam gear 9. Consequently the second small diameter cam gear 9 is fixed with respect to the rotation of the driving gear 1 by locating its projecting portion 12a in opposition to the projecting portion 4b of the cam section 4 of the second great diameter cam gear, as indicated in FIG. 2D, after having been driven by an angle corresponding to the stroke of the projecting portion 12b of the cam portion 12.

Figure 3A:
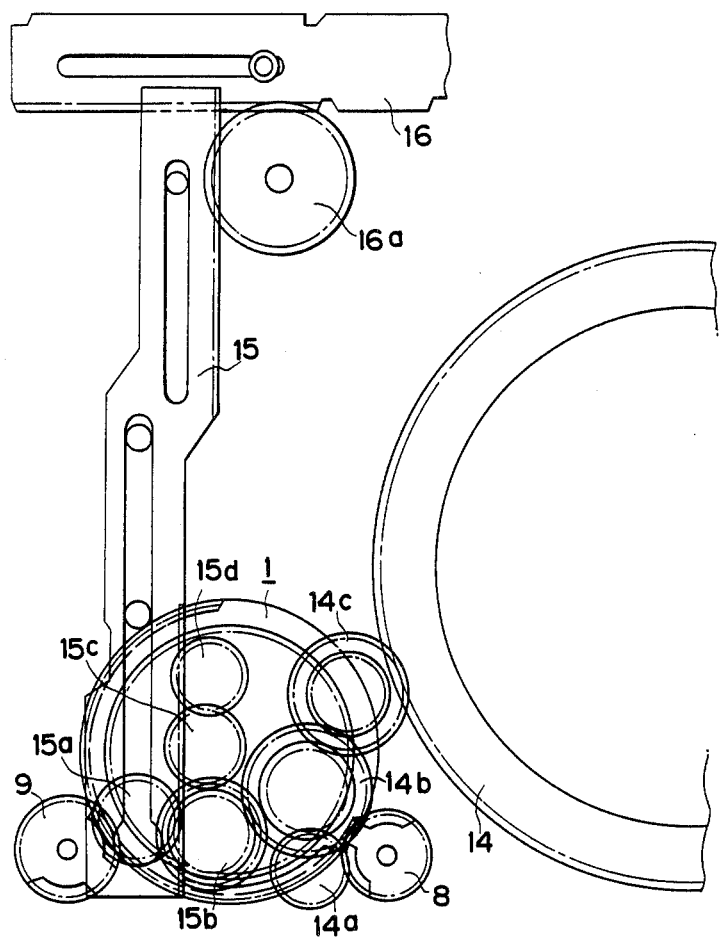
FIG. 3A is a plan view of the whole construction of the same embodiment.
Figure 3B:
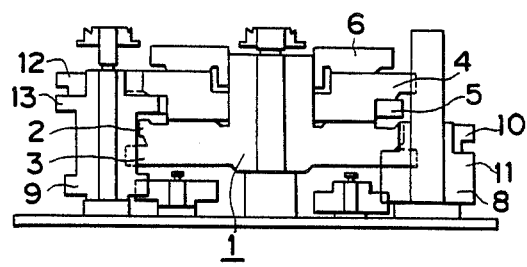
FIG. 3B is a cross-sectional view of the same construction.

FIGS. 3A and 3B show a driving system by means of the small diameter cam gears 8 and 9. In FIG. 3A, a reel base (not shown in the figure) is located above in the figure. A tape loading gear 14 is connected with the first small diameter cam gear 8 through 3 linking gears 14a, 14b and 14c, by means of which gear 14 drawing-out of the tape loading block, the subblock and the guide posts is effected. Further drawing-out of the pinch roller is effected by another gear mechanism not shown in the figure, which is linked with the linking gear 14b. On the other hand, a pinch roller driving cam plate 15 is connected to the second small diameter cam gear 9 through 4 linking gear 15a to 15d, by means of which cam gear 9 thrusting of the pinch roller is effected. Further a mode controlling cam plate 16 is connected to the pinch roller cam plate 15 through the linking gear 16a, by means of which cam plate 16 the mode control such as changing-over of idler gears, etc. is effected.

The operation of this embodiment having the construction described above is as follows.

At first, before the tape loading, as indicated in FIG. 2A, the short stroke projecting portion 10c of the cam section 10 of the first small diameter cam gear 8 is located at the end portion on the staring point side of the recess portion 2a of the first great diameter cam gear so that the gear portion 11 of the first small diameter cam gear 8 is engaged with the operation starting side of the gear 3a of the first great diameter cam gear and that the gear portion 13 of the second small diameter cam gear 9 is placed in the middle of the cut-off portion 5b of the gear section 5 of the second great diameter cam gear. In this way, the second small diameter cam gear 9 is fixed by the fact that the recess portion 12a of its cam section 12 is located in opposition to the projecting portion 4b of the cam section 4 of the second great diameter cam gear.

Then, when the driving motor (not shown in the figure) rotates according to a tape loading instruction, the driving gear 1 rotates counterclockwise in FIG. 2A. The first small diameter cam gear 8 engaged with the gear 3a of the first great diameter cam gear is rotated clockwise by this rotation. As the result, the tape loading gear 14 is rotated clockwise in the figure through the linking gears 14a to 14c, which gives rise to drawing-out of the tape loading block, the subblock, the guide posts, etc. At the same time the pinch roller is drawn out by means of the other gear mechanism linked with the linking gear 14b. At this time, since the recess portion 12a of the cam section 12 of the second small diameter cam gear 9 is located in opposition to the projecting portion of the second great diameter cam gear, the second small diameter cam gear 9 is kept to be fixed with respect to the rotation of the driving gear 1.

In this way the tape loading operation is terminated. The first small diameter cam gear 8, which has rotated by 2 turns, locates the short stroke projecting portion 10c of the cam section 10 in opposition to the end portion on the terminating point side of the recess portion 2a of the first great diameter cam gear, as indicated in FIG. 2B, and it is fixed by locating its recess portion 10a on the projecting portion 2a of the first great diameter cam gear in opposition thereto, as indicated in FIG. 2C. At this time the gear 13 of the second small diameter cam gear 9 is not yet called-in in the gear 5a of the second great diameter cam gear and both of the two small diameter cam gears 8 and 9 are fixed. Then, when the great diameter cam gears rotate counterclockwise by a predetermined angle after the fixation of the first small diameter cam gear 8, the gear 13 of the second small cam gear 9 is called-in from the cut-off portion 5b of the second great diameter cam gear in the gear 5a.

In such a state, where the tape loading operation is terminated, when the driving motor is further rotated, the second small diameter cam gear 9 engaged with the gear 5a of thesecond great diameter cam gear begins to rotate clockwise in the figure from the state indicated in FIG. 2C. In this way the pinch roller driving cam plate 13 moves upward and the mode controlling cam plate 16 moves to the right in the figure from the state indicated in FIG. 3A. As the result, the mode changing-over operation such as changing-over of idler gears, etc. and the pinch roller thrusting operation are performed and the play mode is established.

The second small diameter cam gear 9 is finally fixed with respect to the rotation of the driving gear 1 by locating its recess portion 12a in opposition to the projecting portion 4b of the cam section 4 of the second great diameter cam gear, as indicated in FIG. 2D, after having been driven by an angle corresponding to 2 strokes of the projecting portion 12b of its cam section 12.

As explained above, according to the embodiment, since it is possible to effect fixation and calling-in of gears by means of cams owing to organic combination of the cams and the intermittent gears, e.g. holding means, calling-in means, etc., which were necessary for a mechanism using prior art intermittent gears, are made unnecessary and it can be realized to make the construction considerably smaller and simpler. Further, according to this embodiment, since transmission of the driving force to 2 systems is effected by means of gears for both the systems, even if the remaining driving rotating angle is small (the driving rotating angle of the second great diameter cam gear is about 70°) with respect to that in the prior art mechanism, by which the transmission is effected through a cam for one of the systems, it is possible to obtain satisfactory driving force, which permits to enlarge its field of utilization. In addition, since the operation timing of each of the small diameter cam gears can be set independently and freely by selecting suitably the driving rotating angle for each of the great diameter cam gears and the positional relation among the cam gears including the small diameter cam gears, e.g. it is possible to hold both the small diameter cam gears in the fixed state while rotating the great diameter cam gears, it is not necessary to stop the great diameter cam gears, even if there is an interval between two successive operation timings of the driving systems driven by each of the small diameter cam gears. That is, since, even in the case where the termination of a first operation is not followed directly by the starting of a second operation, it is not always necessary to switch on and off the driving motor, also in this point of view it is possible to enlarge its field of utilization and at the same time to make the construction smaller and simpler.

Furthermore this invention is not restricted to the above embodiment. For example the gear ratio or the ratio of diameter between the great diameter cam gears and the small diameter cam gears can be suitably selected and their arrangement and construction also can be freely chosen. Further, concerning the driving system driven by each of the small diameter cam gears, the arrangement and the number of gears, etc. can be selected freely. For example a construction for driving directly the rack, etc. is possible. In addition, this invention can be applied not only to a magnetic recording device using a rotary head but also to various sorts of devices, by which a plurality of driving systems having different operation timings are driven by a single driving motor and for which it is desired to make the construction smaller and simpler.

As explained above, according to this invention, since fixation and calling-in are effected by cam portions by constructing a first and a second small diameter cam gears so as to be driven by a first and a second great diameter cam gears formed in one body and since the operation timing of each of the small diameter cam gears can be set independently and freely, it is possible to provide a driving force branching gear mechanism, by which the field of utilization can be remarkably enlarged and the construction is made smaller and simpler.

The embodiments of the invention in which an exclusive property or privilege is claimed are defined as follows:

1. A driving force branching gear mechanism, which drives two gear driving systems by means of a single driving motor, comprising:
    a. a driving motor,
    b. a driving gear rotated by said driving motor, provided with a first and a second great diameter cam gears, each of which consists of two layers, a cam section and a gear section, the gear section having a cut-off portion corresponding to a projecting portion of the cam section, and
    c. a first and a second small diameter cam gears, of which consists of two layers, a cam section and a gear section, linked with the cam section and the gear section, respectively, of the first and the second great diameter cam gears, respectively, each of the cam sections having a recess portion fixed by the projecting portion of the cam section of the first and the second great diameter cam gears.

2. A driving force branching gear mechanism according to claim 1, wherein it is used in a magnetic recording device using a rotary head and so constructed that said first small diameter cam gear drives a loading gear. drawing-out a loading block and a pinch roller of said magnetic recording device and that said second small diameter cam gear drives a pinch roller driving cam plate thrusting the pinch roller and a mode controlling cam plate controlling the mode.

* * * * *